Patented Jan. 2, 1940

2,185,772

UNITED STATES PATENT OFFICE 2,185,772

MOLD FOR REFRACTORY CAST MATERIALS

John Charles McMullen, Niagara Falls, N. Y., assignor, by mesne assignments, to The Carborundum Company, Niagara Falls, N. Y., a corporation of Delaware No Drawing. Application December 23, 1935, Serial No. 55,843

2 Claims. (Cl. 49—65)

This invention relates to molds for casting refractory articles from molten refractory oxides and particularly to compositions for use in the construction of molds for that purpose.

It has been my experience that refractory materials such as alumina when not mixed with large proportions of other ingredients can be readily fabricated by casting into molds made of bonded alumina particles or of graphite, or, in the case of castings up to certain limiting dimensions, of metals such as cast iron. I have found, however, that when the material being cast is molten chromite or mixtures of chromite and alumina that serious difficulties are encountered with the molds, particularly when the castings are of the order of size of one cubic foot and larger. It is necessary that the casting be left in the mold until the wall of the casting is thoroughly solidified. Chromite and chrome corundum fusions appear to have a relatively long solidification temperature range although in order to reduce them to completely fluid molten form very high temperatures are required. When such a casting is poured therefore the mold is subjected to extremely high temperatures and cannot be protected from injury by being quickly removed from the casting as is the case when the casting is composed of alumina alone or of other similar materials which have a sharp solidification point.

In the case of long solidification range materials, this means that a large amount of heat from the molten material is transferred into the mold wall before the mold may be safely removed. In the case of large castings in metal molds the result is that the mold is overheated to an extent which causes serious warpage and renders the mold unfit for further service after a very short useful life. Graphite slab molds are satisfactory but are expensive to fabricate and are rather short-lived. Molds made up of slabs of bonded granular materials, such as fused alumina or spinel or the like, are overheated by contact with the hot casting for a long period of time to such an extent that the face of the mold becomes sintered to the casting, rendering it difficult and expensive to clean the cast block afterward. These materials moreover are soluble in the molten chromite so that there is a distinct tendency for the casting to dissolve away from the side of the mold and either permit the molten material to leak out or produce a casting of irregular and uncontrollable shape.

In the case of materials having a sharp solidification point or those having a fusion point below perhaps 1800° C., these difficulties are not experienced since the wall of the casting forms firmly enough to be self-sustaining after relatively slight removal of heat so that the mold can be removed before it warps or reacts. Hence while my improved molds are useful for such melts they are not strictly necessary save for the more difficult compositions.

I have found that the difficulties enumerated may be obviated and such materials as fused chromite and/or mixtures of alumina with chromite in any proportion, or mixtures of various other oxides with magnesia may be satisfactorily cast in almost any size, provided the mold is lined with granular refractory material such as fused alumina to which a minor percentage of some form of carbon has been added before molding the slabs. This has been the more surprising to me because molds made of granular coke proved entirely unsatisfactory due to their tendency to react violently with the reducible oxides in the melt with rapid gas evolution and destruction of the mold.

I find that in the fabrication of molds of my improved type the granular refractory material should be relatively coarse-grained (i. e. coarser than about 50 mesh) in order to permit escape of gases generated at the interface between the mold and the casting. I, accordingly, select for the purpose fused alumina or other sufficiently refractory granular oxidic material of the size passing through a 14 mesh screen and retained on a 36 mesh screen. While these are not the outside size limits, they give a workable texture which I have found quite satisfactory. To this granular material I add from about 5 to about 25% of carbonaceous material which should be materially finer. For carbonaceous material I have, for example, used 180 mesh and finer powdered coke or 12 and finer artificial graphite of the type secured from the core of furnaces in which silicon carbide is manufactured These materials should be mixed sufficiently to establish a coating of carbon over the surfaces of the other granular material. Temporary binders may also be added to permit forming of the mold walls.

In a representative case, which I cite as an example only, a batch of the following composition was thoroughly mixed in dry form:

Parts by weight
14–36 fused alumina_____85
12 and finer core-graphite_____15
Dry sulphite pitch_____ 4

These materials were mixed dry and were then moistened with water and molded into flat slabs which were thoroughly dried before assembly with other similar slabs to form a mold. During the casting operation these slabs may be supported against steel plates or by sand or the like packed behind them. Obviously such plates may be replaced by directly formed one-piece or other molds. Satisfactory molds may also be fabricated by lining the interior faces of fused alumina molds for example with the mixture described above.

The sulphite pitch which acts as a temporary binder is destroyed by the heat so that these mold slabs soften in use and can be readily removed from the casting when desired. They do not however collapse prematurely nor react with the mold to an objectionable degree. The refractory granules are not, moreover, injured and may be reused after admixture with further carbonaceous material.

The fact that the composition tends to disintegrate somewhat under the influence of heat renders this composition also unusually satisfactory for construction of mold parts or cores for the inner walls of hollow castings such as cylinders made of fused refractory mixtures of the type described. When so used the temporary binder gives way and the granular refractory material is squeezed out of the way by the contracting castings to an extent which permits cooling of such castings without cracking.

Having thus described my invention and given an example of its use sufficient to permit practice of the invention by those skilled in the art, what I desire to secure by claims is as follows.

I claim:

1. A mold facing for castings of refractory material, said facing being composed of an unfired mixture of coarse refractory granules and fine carbonaceous material together with a temporary binder.

2. In a mold for the casting of molten refractory oxides, a facing for contact with said molten material, which facing consists of an unfired mixture of 75–95% of inert refractory granules in the approximate grit range between 14 and 50 mesh and 5–25% of finely divided carbon closely commingled therewith together with a temporary binder.

JOHN CHARLES McMULLEN.